United States Patent [19]
Weigle

[11] 3,835,324
[45] Sept. 10, 1974

[54] PIPE WELD INSPECTION METHOD AND APPARATUS

[76] Inventor: Orville C. Weigle, 6617 Ariel St., Houston, Tex. 77036

[22] Filed: Oct. 4, 1972

[21] Appl. No.: 294,943

[52] U.S. Cl................. 250/360, 250/312, 250/363
[51] Int. Cl. .............................................. G01t 1/10
[58] Field of Search............ 250/83.3 D, 65 R, 312, 250/360, 363

[56] References Cited
UNITED STATES PATENTS

| | | | |
|---|---|---|---|
| 2,859,349 | 11/1958 | Bradley et al................. | 250/83.3 D |
| 3,005,104 | 10/1961 | Ritchey......................... | 250/83.3 D |
| 3,492,477 | 1/1971 | Arnesen........................ | 250/83.3 D |
| 3,683,188 | 8/1972 | Hugonin........................ | 250/83.3 D |

FOREIGN PATENTS OR APPLICATIONS

| | | | |
|---|---|---|---|
| 905,401 | 9/1962 | Great Britain................ | 250/83.3 D |

Primary Examiner—James W. Lawrence
Assistant Examiner—Harold A. Dixon

[57] ABSTRACT

An illustrative embodiment of the invention includes method and apparatus for pipe weld seam inspection. A gamma ray source of relatively low intensity is disposed on the interior portion near the center of a pipe section being inspected. A gamma ray detector comprising an activated scintillating crystal and a photomultiplier tube is traversed in a track on an elastomeric belt about the circumference of the pipe and maintained adjacent said weld seam at all circumferential points. The intensity of the gamma radiation penetrating the weld seam is sensed and recorded as a function of the circumferential location of the detectors. This recording may then be interpreted in terms of the material density of the weld at all circumferential points on the seam.

7 Claims, 3 Drawing Figures

PATENTED SEP 10 1974 3,835,324

PIPE WELD INSPECTION METHOD AND APPARATUS

BACKGROUND OF THE INVENTION

This invention relates to pipe inspection apparatus and more particularly to radioactive source gamma ray emission pipe weld inspection apparatus.

In laying oil and gas supply pipe lines across large distances, it is frequently necessary to install the pipe in remote locations. The pipe used in such pipe lines must be securely welded together at each joint or disastrous leakage can result. Due to the fact that these pipe lines are typically laid cross-country in rather remote locations it has in the past been difficult to provide sophisticated and accurate apparatus at the site of the pipe laying to inspect the weld joints between the pipe sections satisfactorily.

It has become common practice in inspecting welded joints in pipe lines to utilize a powerful radioactive gamma ray source (typically on the order of 100 curies or more) disposed in the center of the pipe section. This source emits a large flux of gamma radiation in all directions. Photographic film sensitive to the gamma radiation is then wrapped around the weld seam on the pipe and exposed to the gamma radiation for a period of time adequate to provide a latent image of the weld seam on the film. The photographic film is then developed and the image of the weld seam inspected before the pipe is buried in order to assure good weld seams at all pipe joints.

This process has the disadvantage that large quantities of photographic film are required since a 1:1 dimensional relationship between film and the weld seams is required in using this technique. Since these cross-country pipe lines are frequently as large as 20 to 30 inches in diameter this can provide an enormous amount of photographic film which must be inspected with particular detail. Moreover, contractual and governmental regulations may require that this inspection film be retained in storage for a number of years. Due to the large bulk, this can require an enormous amount of space. Access to the film for a particular pipe joint or seam is also difficult to obtain because of this bulkiness.

Another serious short-coming to this prior art technique has been that such an intense radioactive source must be used due to the relative insensitivity of the photographic film to the gamma radiations. This has led to the unnecessarily hazardous exposure of personnel to the intense gamma radiations produced by the gamma ray sources used in this technique. It is extremely hazardous to handle such an intensely radioactive source and personnel who are exposed to it for a prolonged period of time can develop many damaging side effects.

Accordingly, it is an object of the present invention to provide a new pipe weld inspection technique using a radioactive source and which requires a much less intense radioactive source than required by prior art methods.

It is a further object of the present invention to provide a pipe weld inspection apparatus which does not use photographic film and which does not require the use of a record medium which is in a 1:1 dimensional relationship with the pipe seam being inspected.

It is a still further object of the present invention to provide a much less hazardous to personnel pipe weld inspection apparatus than has heretofore been employed.

Yet another object of the present invention is to provide a radioactive pipe weld inspection apparatus utilizing much more sensitive detection apparatus than heretofore used in the art and which can operate from a much less intense radioactive source than that used in the prior art.

The above and other objects, features and advantages of the present invention are provided by the pipe weld inspection method and apparatus of the present invention which utilizes a relatively less intense radioactive source than those used in the prior art. The radioactive source is disposed on the interior at the center of the pipe being inspected in the manner conventional in the prior art. Gamma radiation emitted by the source penetrates the weld and the intensity of the radiation penetrating the weld area is measured by sensitive radiation detection apparatus. This detection apparatus comprises an activated crystal-photomultiplier tube detector which is connected to pulse height discriminating and counting circuitry. The photomultiplier tube and crystal detector is moved around the circumference of the pipe whose weld joint is being inspected by a portable radioactivity probe carrier. The probe carrier rides on an elastomeric belt which is attached circumferentially about the pipe near the vicinity of the weld. The elastomeric belt is provided with a track in which a motor driven wheel on the portable radiation sensor probe is mounted. The apparatus moves about the entire circumference of the pipe at a rate suitable to provide accurate counting statistics by the crystal-photomultiplier tube radiation detecting apparatus. The resulting intensity measurements of the gamma radiations penetrating the weld area may then be interpreted in terms of the quality of the weld according to predetermined relationships.

The present invention may be better understood by reference to the following detailed description thereof when taken in conjunction with the appended drawings in which:

DESCRIPTION OF THE PREFERRED EMBODIMENTS

Figure 1:
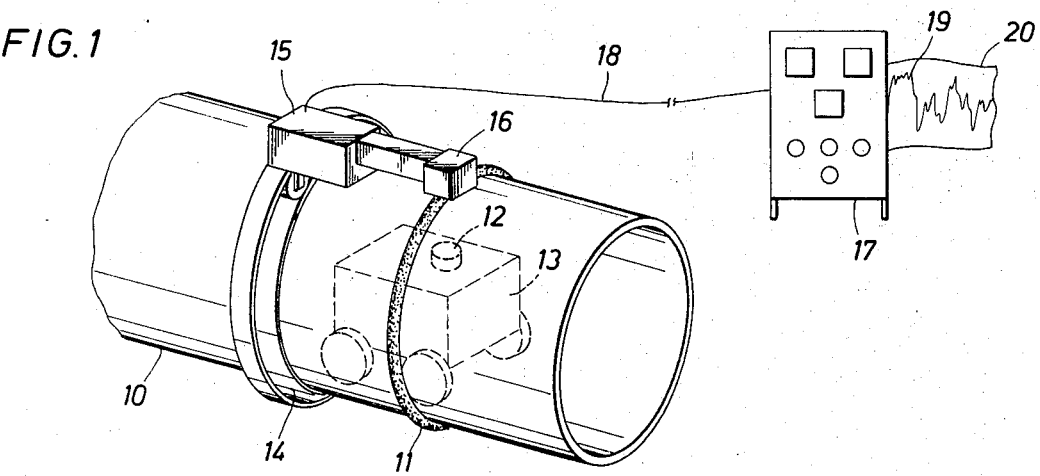
FIG. 1 is an overall schematic diagram showing the pipe weld inspection apparatus of the present invention deployed on a section of pipe having a welded joint which is being inspected.

Referring initially to FIG. 1 the pipe weld inspection apparatus of the present invention is shown deployed on a section of pipe 10 having a weld or seam 11 which is to be inspected for defect. Defects in the weld seam of the pipe joint 10 can comprise, for example, voids or air spaces due to the improper welding techniques or slag filled voids which can occur as a result of foreign contaminant material being present in the pipe joint at the time it is welded. Such void areas in the welded portion of the pipe contribute to weakness and can cause disastrous leakages if the pipe were buried with these defects present. Accordingly, it has been the practice to inspect the pipes seams in the past by the aforementioned photographic techniques. This, however, has required the usage of extremely intense radioactive sources which are very hazardous to personnel. This has also provided the inspection personnel with voluminous records of photographic data which must be maintained over long periods of time in some instances.

The present invention as depicted in FIG. 1 utilizes a radiation source 12 disposed in the center of the pipe section 10 and carried on a remotely operable cart 13 such as is well known in the prior art. Typically, prior art radiation source carriers 13 have operated by a motor driven cart such as cart 13 which moves inside the length of pipe being examined and which, when a weld seam is encountered, is stopped by the activation of a microswitch which is tripped by the raised weld seam inside the pipe (as depicted at 25 of FIG. 2).

In any event, the radioactive source 12 is disposed as near the center of the pipe section 10 as possible so that uniform radiation emitted therefrom will penetrate the weld line 11 with uniform intensity about the circumference of the pipe. The present invention utilizes an elastomeric belt or track 14 which is attached about the pipe in a snug fitting relationship about its entire circumference. A suitable detachable connecting clasp (not shown) may be provided for the purpose of moving the elastomeric belt from seam to seam as the pipe welds are being inspected. The elastomeric belt can comprise a rubber or cord reinforced polyethelene or polyvinyl chloride belt as desired. The slight stretch characteristic of such a belt assures a snug fit about the pipe section 10. A portable radiation sensitive probe comprising a motor driven cart portion 15 and a radiation detector portion 16 which is disposed immediately adjacent the weld seam is also depicted in FIG. 1. The motor driven cart portion 15 moves on the elastomeric track 14 about the circumference of the pipe at a constant speed and thereby exposes the radiation detector portion 16 uniformly over the weld seam area of the pipe. Signals from the radiation sensitive probe are conducted to a control panel 17 via a flexible cable 18. The control panel 17 includes a recorder which producs a visual record 19 of the intensity of gamma radiation penetrating the weld seam as a function of the position of the probe 16 and displays these intensity indications on a record medium 20.

The intensity I of the gamma radiations penetrating the weld seam portion of the pipe are proportional to the density of the material comprising the weld seam on the pipe according to the relationship of equation (1)

$$I = I_0 e^{-KX}$$

where the intensity $I$ is proportional to the incident radiation intensity $I_o$ and is inversely proportional to the thickness $X$ of the weld joint by an amount which is proportional to the density $K$ of the material. The quantity $e$ is, of course, the Naperian logarithm base 2.718—. Thus, if a uniformly thick pipe is exposed to gamma radiation in the manner of FIG. 1 the intensity of gamma radiations penetrating it is directly proportional to the density of the material comprising the pipe weld seam. Voids or slag filled irregularities in the weld seam may be detected as density variations by the variation in intensity of gamma radiation which penetrates the weld seam from the interior of the pipe.

Figure 2:
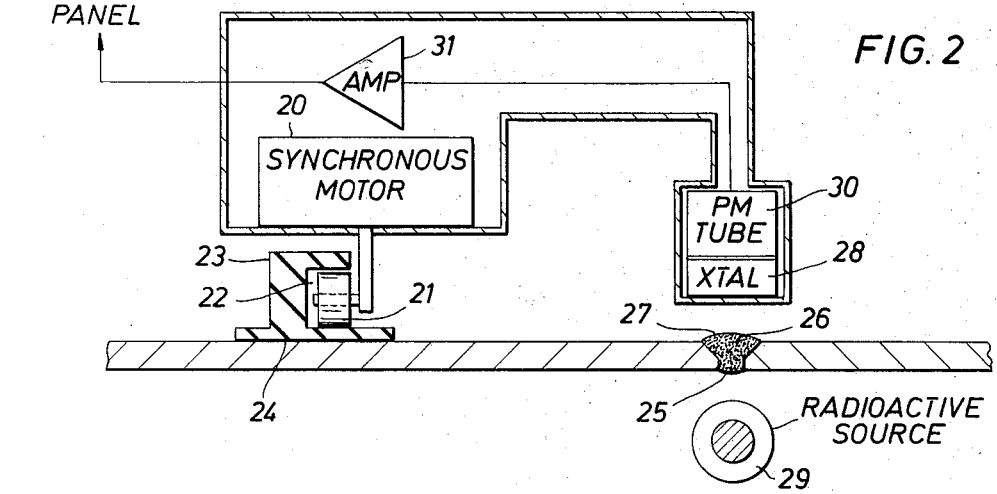
FIG. 2 is a detailed cross-sectional view showing the elastomeric belt and portable radiation sensitive probe carrier portion of the apparatus of the invention employed on a pipe.

Referring now to FIG. 2, the portable radiation sensitive probe portion of the invention is illustrated in more detail but still schematically. A synchronous motor 20 which is powered via electrical power supplied by the cable 18 is used to move a drive wheel 21. The drive wheel 21 rides in a track 22 provided on the elastomeric belt member 23 which is attached snugly to the pipe being inspected. A cross-sectional view of one portion of the pipe 24 is illustrated and shows a weld seam in cross-section at 26. The weld seam 26 has an interior protrusion 25 interior to the pipe wall and an exterior protrusion 27 on the exterior portion of the pipe. The radiation sensitive detector may comprise a sodium or cesium iodide (Thallium) activated crystal 28 which is disposed over the exterior portion 27 of the weld seam. Gamma radiations from a radioactive source 29 disposed interior to the pipe thus penetrate the weld seam 26 and enter the sodium or cesium iodide activated crystal 28. Gamma radiations entering the crystal 28 cause the emission of light flashes whose intensity is proportional to the energy of the gamma rays entering the crystal. The photomultiplier tube 30 is optically coupled to the crystal 28 and provides electrical signals proportional in amplitude to the intensity of the light flashes produced in the crystal 28. These electrical pulses are supplied to a preamplifier 31 and thence to the control panel 17 of FIG. 1 where they are processed in the manner to by subsequently described.

When the elastomeric belt or track 23 is attached to the pipe about its exterior circumference, it is important that the distance of the belt from the weld seam 26 be maintained constant so that the photomultiplier tube and crystal radiation detector may be correctly suspended the same distance above the exterior portion 27 of the weld seam 26 about the entire circumference of the pipe. In this manner, accuracy of the measurements is thereby assured. It would be possible, for example, to provide an elastomeric belt 23 which was wide enough to abut the weld seam exterior portion 27 about the entire circumference of the pipe for this purpose. Thus, the track portion 22 of the belt 23 would be maintained the same distance from the weld seam about its exterior portion 27 and the correct spacing would be assured.

The synchronous motor 20 drives the portable radiation sensitive probe at a rate suitable to provide good counting statistics for the gamma radiation penetrating the weld seam. For example, a 20 inch diameter pipe would have roughly a 60 inch diameter exterior circumference. In this case the synchronous motor 20 could provide movement to the radiation sensitive probe speed of about ¾ inches per second. In such a case it would take slightly more than 1 minute for the probe to traverse the entire exterior circumference of the pipe. Since the radiation detector crystal 28 is much more sensitive to gamma radiation than the photographic film used in the prior art a much less intense radiation source 29 may be used. For example, in the present invention, the intensity of the radiation source may be reduced to approximately ½ curie or 500 millicuries as opposed to over 100 curies of radiation being required for 20 inch diameter pipes in the photographic film inspection techniques of the prior art. The radiation source 29 may thus comprise an Iridium 192 or Cobalt 60 or other gamma ray emitting radiation source of approximately ½ curie intensity. Of course, an even less intense radioactive source could be used if it is desired to move the radiation sensitive detector more slowly about the exterior portion of the weld seam.

Figure 3:
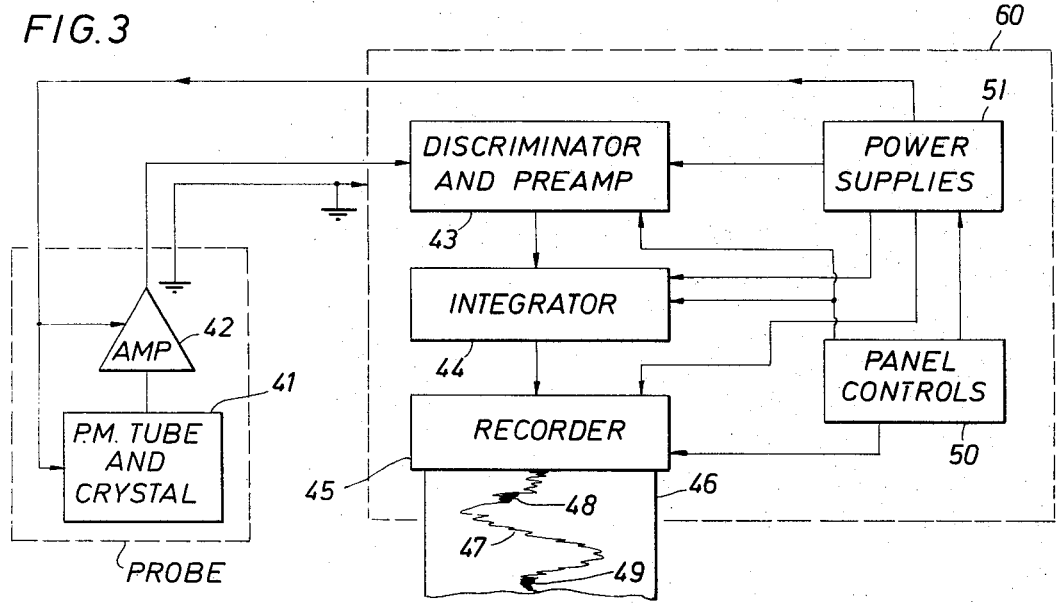
FIG. 3 is an overall schematic block diagram illustrating the electronic circuitry portion of the present invention which includes the portable radiation sensitive probe and means for providing a visual record of the intensity of the gamma radiation penetrating the weld area of the pipe being inspected.

Referring now to FIG. 3 a block diagram showing the electronic circuitry portion of the invention is illustrated. The photomultiplier tube and crystal are illustrated at 41 in FIG. 3. These correspond to the photomultiplier tube 30 and sodium or cesium activated crystal 28 of FIG. 2. Signals produced by the photomultiplier tube are conducted to a preamplifier 42 which corresponds to the amplifier 31 of FIG. 2. These signals are then conducted along a cable corresponding to the cable 18 of FIG. 1 to the control console portion 60 of the apparatus where the pulse signals from the photomultiplier tube are supplied to a discriminator and preamplifier circuit 43. The discriminator portion of circuit 43 may be set to exclude noise or background gamma ray pulses generated below a certain level. Thus, background radiations due to other than the Cobalt 60 or Iridium 192 source being used may be discriminated against and excluded from the measurement. In this manner a more accurate radiation measurement of the gamma radiation actually penetrating the weld portion of the pipe may be achieved. Only those pulse signals exceeding the predetermined level of the discriminator 43 are supplied to a conventional integrator circuit 44 where they are integrated or summed and converted to an output voltage which is proportional to the counting rate of the photomultiplier tube-crystal radiation detector in the probe 41. This summed signal is then supplied to a conventional strip chart recorder 45 which drives a record medium 46 at a rate corresponding to the rate of the travel of the portable probe of FIG. 2 about the exterior circumference of the pipe section being inspected. Thus, one inch on the record medium 46 may be made to correspond to one foot or even more of the exterior circumference of the pipe section being inspected depending on the relationship of chart drive speed to probe speed. A plot of the intensity of the gamma radiation 47 is thus derived which is indicative of the quality of the weld seam at each pipe joint.

Calibration or hash marks 48 and 49 are provided at the beginning and end of the traverse of each passage of the portable probe 15 of FIG. 1 about the elastomeric belt. For example, by embedding a marker apparatus in the elastomeric belt at a particular point (such as the starting point) an electrical signal may be generated at the time the probe encounters this. This signal may then be used to provide reference marks 48 and 49 on the record medium. With the belt thus positioned consistently on the exterior surface of the pipe the location of any defect in the weld about a particular pipe joint may be immediately determined by an inspection of the record on record medium 46. The operator could be provided alternatively with a panel control 50 which contains a marker for providing the hash marks 48 and 49 of the record to indicate the beginning and end of a particular traverse so that these may be manually applied to the record medium if desired. Finally, power supplies 51 are provided in the control console 60 for supplying operational voltages to the other electronic portions of the apparatus and to the synchronous drive motor of the probe. These could be conventional supplies such as onan generators or battery power supplies if desired.

Summarizing the operation of the invention, a portable probe carrying a radiation sensitive detector is transported about the external circumference of a pipe having a weld joint which is being inspected. An elastomeric belt or track which is placed uniformly distant from the weld joint at all points about the circumference supplies the guidance to the portable radiation sensitive probe and assures that the radiation sensing portion of the probe is correctly positioned over the weld joint. A radioactive source is disposed at the center of the pipe joint being inspected in the manner of the prior art. Gamma rays penetrating the welded pipe joint are detected by the radiation sensitive detector and output pulses proportional to the intensity thereof are generated. These pulses are separated from background radiation, summed and displayed on record medium by a recorder in the manner of a visual display or, if desired, in the form of a magnetic tape record. Calibration or reference location marks are also provided on the record display to indicate the beginning and end of each traverse of the probe about the circumference of a pipe. In this manner a permanent visual record of the quality of the weld about each pipe joint is provided without undue storage of photographic film. A much smaller amount of record medium is required as the scale may be varied on the record medium as desired. Due to the increased sensitivity of the radiation detector used in the apparatus of the present invention, a much less intense radioactive source is needed than required in the prior art photographic techniques. Thus, a much improved pipe inspection apparatus system from that used in the prior art is disclosed.

The above description may make other alternative embodiments of the invention apparent to those skilled in the art. Accordingly, it is the aim of the applicant to cover all such changes and modifications as fall within, the true spirit and scope of the invention in the appended claims.

I claim:

1. Apparatus for inspecting weld seams in pipe lines for defects, comprising:
   means, disposed substantially at the center of the interior portion of a pipe section, for emitting gamma radiation;
   radiation detector means disposed adjacent the weld seam to be inspected on the exterior of the pipe section for detecting gamma radiation penetrating said weld seam;
   means for moving said radiation detector means at a constant speed circumferentially about the exterior portion of a pipe section and including elastomeric track means disposed circumferentially about said pipe section being inspected and disposed approximately longitudinally equidistant at all circumferential points from said weld seam for guiding said means for moving said radiation detector; and
   means for counting and recording signals developed by said detector means as a function of the circumferential position of said detector means on said pipe.

2. The apparatus of claim 1 wherein said counting and recording means includes integrator means and chart recorder means for providing a visual record of said detector means signals as a function of the circumferential position of said detector means.

3. The apparatus of claim 1 wherein said radiation detector means comprises a thallium activated sodium iodide crystal optically coupled to a photomultiplier tube.

4. The apparatus of claim 1 wherein said radiation detector means comprises an activated cesium iodide crystal optically coupled to a photomultiplier tube.

5. The apparatus of claim 1 wherein said radiation source does not exceed 500 millicuries in intensity.

6. A method of inspecting pipe weld seams for welding defects comprising the steps of:

emitting gamma radiation from a gamma ray source located substantially at the interior center of a pipe section being inspected;

detecting, at a point substantially adjacent said weld seams being inspected, gamma radiation from said source which have penetrated said weld seam and generating pulse signals representative thereof;

repeating said detecting step at all circumferential points adjacent said weld seam on said pipe section by moving a scintillation type radiation detector at a constant speed about the circumference of said pipe in an elastomeric track means disposed circumferentially about said pipe and disposed approximately longitudinally equidistant at all circumferential points from said weld seam; and recording output signals representative of said representative pulse signals as a function of the circumferential locations of said detector.

7. The method of claim 6 wherein said signals are recorded in other than a 1:1 dimensional relationship with the circumferential location of the measurement on the pipe weld seam being inspected.

* * * * *